(12) United States Patent
Duan

(10) Patent No.: US 7,695,699 B2
(45) Date of Patent: Apr. 13, 2010

US007695699B2

(54) METAL SULFATE ALCOHOL COMPOSITION AND PROCESS THEREWITH

(76) Inventor: Jiwen F. Duan, 207 Gingergate Dr., Cary, NC (US) 27519

( * ) Notice: Subject to any disclaimer, the term of this patent is extended or adjusted under 35 U.S.C. 154(b) by 0 days.

(21) Appl. No.: 12/124,678

(22) Filed: May 21, 2008

(65) Prior Publication Data

US 2009/0292102 A1    Nov. 26, 2009

(51) Int. Cl.
  *C01B 25/32* (2006.01)
(52) U.S. Cl. ............. 423/157.4; 423/155; 423/157.3; 423/530; 423/544; 423/551; 524/418; 524/422; 524/423
(58) Field of Classification Search ............ 423/511, 423/513, 517, 522, 530, 541.1, 544, 548, 423/549, 554, 566.3, 155, 157.3, 157.4, 158, 423/160, 161, 164, 170, 182, 183, 184, 199; 106/400, 401, 461, 471; 524/402, 418, 422, 524/423
See application file for complete search history.

(56) References Cited

U.S. PATENT DOCUMENTS

| 4,043,971 | A | 8/1977 | Wurmb |
| 5,178,943 | A | 1/1993 | Asai et al. |
| 6,027,803 | A | 2/2000 | Jacobson et al. |
| 6,699,546 | B2 | 3/2004 | Tseng |
| 7,182,997 | B2 | 2/2007 | Murschall et al. |
| 2003/0113490 | A1 | 6/2003 | Jen |

FOREIGN PATENT DOCUMENTS

| CN | 01107744.1 | 8/2002 |
| CN | 01115055.6 | 1/2003 |
| CN | 03113436.X | 11/2004 |

OTHER PUBLICATIONS

STIC translation of patent application CN 01107744.1 (reference cited in IDS).*

* cited by examiner

*Primary Examiner*—Ling-Siu Choi
*Assistant Examiner*—Frances Tischler

(57) ABSTRACT

A metal sulfate alcohol composition as well as a process to produce such composition is disclosed. Also disclosed is a process to produce polyester containing the metal sulfate alcohol composition.

10 Claims, No Drawings

METAL SULFATE ALCOHOL COMPOSITION AND PROCESS THEREWITH

FIELD OF THE INVENTION

This invention relates to a metal sulfate alcohol composition, to a process for producing the composition, and to a process for producing a polyester containing the composition.

BACKGROUND OF THE INVENTION

Metal sulfates have been widely used in polyester. U.S. Pat. No. 4,043,971 disclosed a polybutylene terephthalate molding compositions of improved tracking resistance, which contained calcium sulfate or barium sulfate 10 to 40% by weight. Calcium sulfate or barium sulfate powder was added to the polyester after polymerization. Calcium sulfate and barium sulfate are not soluble in alcohol and water. It is difficult to form stable slurry for use in polyester polymerization.

U.S. Pat. No. 6,699,546 disclosed a hot-fill polyester bottle containing barium sulfate 40-50 ppm for improved crystallization and strength. China Patent 03113436.X disclosed a polyester sewing thread, which contained barium sulfate 0.10% to 0.15% for improved fiber strength and spinning performance. In these inventions, barium sulfate powder was dispersed in glycol through milling, the slurry was then added to polyester polymerization process. Barium sulfate was poorly dispersed in glycol. After agitation stops for a few hours, the slurry separates into two layers, clear liquid on top, and barium sulfate precipitates on the bottom.

China patent 01107744.1 and 01115055.6 disclosed a collosol of barium sulfate in glycol. This collosol contained barium sulfate 1-30% (preferably 2-25%), $C_2$-$C_4$ glycol 68-97% (preferably 73-96%), and balancing water less than 2% by weight. The preparation was complicated. First, barium hydroxide octahydrate was dissolved in glycol and water at hot temperature and then filtered. Dilute sulfuric acid of 0.5-2.0 mol/L (4.7-17.2% by weight), preferably 1.5 mol/L (13.2% by weight), was added to react with barium hydroxide. The colloidal must be distilled at 180-197° C. to remove water. Barium sulfate particle size was 10 to 100 nm. Barium sulfate particles of this size are very easy to form large agglomerates, which cause non-uniform dispersion in polyester. The distillation to remove large volume of waste water requires large amount of energy input, which is an environmental concern.

Therefore, there is a need to develop a metal sulfate alcohol composition for use in polyester polymerization, which is stable without agitation, relatively easy to manufacture, and does not produce large volume of waste water; appropriate particle sizes are less likely to form agglomerates, therefore uniform dispersion in polyester.

SUMMARY OF THE INVENTION

The invention discloses a metal sulfate alcohol composition comprising (a) a metal sulfate, (b) an alcohol, (c) water, wherein said metal sulfate is 1% to 80% of said composition, said alcohol is about 12% to about 98% of said composition, and said water is less than 40% of said composition, all by weight.

The invention also discloses a process for producing a metal sulfate alcohol composition comprising contacting (a) a metal hydroxide, (b) sulfuric acid, (c) an alcohol, (d) optionally water, wherein said metal hydroxide is 1% to 95% of said composition; and sulfuric acid has concentration of 18% to 105% by weight.

Further disclosed is a process for producing a polyester comprising contacting a polymerization mixture with a metal sulfate alcohol composition, wherein said composition comprises (a) a metal sulfate, (b) an alcohol, (c) water; said polymerization mixture comprises a carbonyl compound or oligomer thereof and a glycol.

DETAILED DESCRIPTION OF THE INVENTION

The invention discloses a metal sulfate alcohol composition comprising (a) a metal sulfate, (b) an alcohol, (c) water, wherein said metal sulfate is calcium sulfate, barium sulfate, strontium sulfate, lead sulfate, or combinations of two or more thereof, said alcohol is $Z(OH)_m$, Z is a hydrocarbon or a hydrocarbon oxygen group, m is 1 to 5; said metal sulfate is about 1% to about 80% of said composition, said alcohol is about 12% to about 98% of said composition, and said water is less than 40% of said composition, all by weight.

Widely used alcohol is methanol, ethanol, propanol, butanol, glycerol, trimethylolpropane, 1,1,1-tris(hydroxymethyl)ethane, pentaerythritol, lactic acid, ethylene glycol, monoethylene glycol, 1,2-propanediol, 1,3-propanediol, 1,2-butanediol, 1,3-butanediol, 1,4-butanediol, pentylene glycol, neopentyl glycol, diethylene glycol, triethylene glycol, polyethylene glycol, or combinations of two or more thereof, commonly used metal sulfate is barium sulfate.

Preferably said barium sulfate is about 5% to about 70% by weight of said composition, more preferably about 20% to 65%, most preferably 30% to 60%.

Preferably said alcohol is about 15% to about 95% by weight of said composition, more preferably about 20% to 80%, most preferably 23% to 67%.

Preferably said water is about 1% to about 40% by weight of said composition, more preferably about 2% to 30%, most preferably about 3% to 20%.

The invention also discloses a process for producing a metal sulfate alcohol composition comprising contacting (a) a metal hydroxide, (b) sulfuric acid, (c) an alcohol, wherein said metal sulfate is calcium sulfate, barium sulfate, strontium sulfate, lead sulfate, or combinations of two or more thereof, said metal hydroxide is calcium hydroxide, barium hydroxide, strontium hydroxide, lead hydroxide, or combinations of two or more thereof, said barium hydroxide is $Ba(OH)_2 \cdot nH_2O$, n is 0 to 20; said sulfuric acid has concentrations of about 5% to 105% by weight; said alcohol is $Z(OH)_m$, Z is a hydrocarbon or a hydrocarbon oxygen group, m is 1 to 5; said alcohol is about 12% to about 98% by weight of said composition, and said metal hydroxide is about 1% to about 95% by weight of said composition.

Optionally water can be added during the dissolving of metal hydroxide or during neutralization reaction. The amount of added water should be minimized, because the waste water needs to be removed later.

Widely used alcohol is methanol, ethanol, propanol, butanol, glycerol, trimethylolpropane, 1,1,1-tris(hydroxymethyl)ethane, pentaerythritol, lactic acid, ethylene glycol, monoethylene glycol, 1,2-propanediol, 1,3-propanediol, 1,2-butanediol, 1,3-butanediol, 1,4-butanediol, pentylene glycol, neopentyl glycol, diethylene glycol, triethylene glycol, polyethylene glycol, or combinations of two or more thereof.

Widely used metal sulfate is barium sulfate. Widely used metal hydroxide is barium hydroxide anhydrous, barium hydroxide monohydrate, barium hydroxide octahydrate, or combinations of two or more thereof. Preferably said barium hydroxide is barium hydroxide octahydrate. Preferably said barium hydroxide octahydrate is about 7% to 83% by weight of said metal sulfate alcohol composition, more preferably about 20% to about 80%, most preferably about 40% to about 70%.

Preferably said sulfuric acid has concentrations of about 18% to 105% by weight, more preferably 30% to 100%, more preferably 50% to 80%.

The mole ratio of said sulfuric acid and said metal hydroxide is about 0.9:1.0 to about 1.1:1.0, preferably about 0.95:1.00 to 1:05:1.00, more preferably about 0.99:1.00 to 1.01:1.00, most preferably about 1:1. The pH of said metal sulfate alcohol composition is about 2 to 13, preferably 4 to 12, more preferably 6 to 10, most preferably 7 to 8.

Preferably said alcohol is about 15% to 95% by weight of said composition, more preferably about 20% to 80%, most preferably about 23% to 67%.

Metal hydroxide, sulfuric acid, alcohol, and optionally water can be added in any sequence or in any means effective to produce said metal sulfate alcohol composition.

Optionally the composition can be heated during dissolving of metal hydroxide or during the reaction between metal hydroxide and sulfuric acid or after the reaction.

Optionally the composition can be cooled during dissolving of metal hydroxide or during the reaction between metal hydroxide and sulfuric acid or after the reaction.

Preferably water in the metal sulfate alcohol composition is partially or completely removed by suitable means. One of the suitable means is distillation. The distillation temperature can be 60° C. to 250° C., preferably 100° C. to 200° C. After partial or complete water removal, water is about 0% to about 20% by weight of said metal sulfate alcohol composition, preferably about 1% to 10%, more preferably about 2% to 6%, most preferably about 3% to 5%.

Preferably the metal sulfate alcohol composition is filtered before use.

Optionally the metal sulfate alcohol composition can be diluted in any suitable ratio in a compatible solvent. Example of suitable solvent include alcohol, water, methanol, ethanol, ethylene glycol, 1,3-propanediol, 1,4-butanediol, and glycerol. Preferred dilution ratio is 1:10, more preferably 1:4, most preferably 1:2.

The metal sulfate alcohol composition can be produced in the same location or different location from the polyester production site.

The invention also provides a process for producing a polyester comprising contacting a polymerization mixture with a metal sulfate alcohol composition wherein said metal sulfate alcohol composition comprises (a) a metal sulfate, (b) an alcohol, (c) water; wherein said metal sulfate is about 1% to 80% of said composition, said alcohol is about 12% to about 98% of said composition, and said water is less than 40% of said composition, all by weight; said metal sulfate is calcium sulfate, barium sulfate, strontium sulfate, or lead sulfate, or combinations of two or more thereof, said alcohol is $Z(OH)_m$, Z is a hydrocarbon or a hydrocarbon oxygen group, m is 1 to 5; said metal sulfate is about 0.001% to about 40% by weight of said polyester;

said polymerization mixture comprises a carbonyl compound or oligomer thereof and a glycol; said carbonyl compound is HO—R—COOH or R'O$_2$CACO$_2$R'; A is an alkylene group, arylene group, alkenylene group, or combinations of two or more thereof having 2 to 30 carbon atoms per group; each R or R' is independently selected from (i) hydrogen, (ii) a hydrocarboxyl radical having a carboxylic acid group at the terminus, or (iii) a hydrocarbyl radical having 1 to 30 carbon atoms selected from an alkyl, alkenyl, aryl, alkaryl, aralkyl radical, or combinations of two or more thereof; said oligomer has 1 to 100 repeat units.

Preferably said glycol of polymerization mixture is selected from the group consisting of ethylene glycol, monoethylene glycol, 1,2-propanediol, 1,3-propanediol, 1,2-butanediol, 1,3-butanediol, 1,4-butanediol, pentylene glycol, neopentyl glycol, 1,6-hexanediol, 1,4-cyclohexanedimethanol, diethylene glycol, triethylene glycol, polyethylene glycol, and combinations of two or more thereof. Most preferred glycol is ethylene glycol, 1,3-propanediol, or 1,4-butanediol.

Preferred alcohol is methanol, ethanol, propanol, butanol, glycerol, trimethylolpropane, 1,1,1-tris(hydroxymethyl)ethane, pentaerythritol, lactic acid, ethylene glycol, monoethylene glycol, 1,2-propanediol, 1,3-propanediol, 1,2-butanediol, 1,3-butanediol, 1,4-butanediol, pentylene glycol, neopentyl glycol, diethylene glycol, triethylene glycol, polyethylene glycol, or combinations of two or more thereof. Most preferred alcohol is methanol, ethanol, ethylene glycol, 1,3-propanediol, and 1,4-butanediol. Preferably said alcohol is about 15% to about 95% by weight of said metal sulfate alcohol composition, more preferably 20% to 80%, most preferably 23% to 67%.

Preferably said water is about 0.01% to about 40% by weight of said metal sulfate alcohol composition, more preferably 2% to 30%, most preferably 3% to 20%.

Preferred metal sulfate is barium sulfate; Preferred metal sulfate alcohol composition is barium sulfate alcohol composition.

Preferably metal sulfate is about 0.01% to about 10% by weight of said polyester, more preferably about 0.05% to about 2%.

Examples of suitable carbonyl compound include, but are not limited to, terephthalic acid, isophthalic acid, phthalic acid, naphthalenedicarboxylic acid, 1,8-naphthalic anhydride, oxalic acid, malonic acid, succinic acid, glutaric acid, adipic acid, sebacic acid, maleic acid, maleic anhydride, fumaric acid, cyclohexane dicarboxylic acid, 1,2-cyclohexanedicarboxylic anhydride, dimethyl terephthalate, dimethyl isophthalate, dimethyl phthalate, dimethyl naphthalenedicarboxylate, dimethyl glutarate, dimethyl adipate, dimethyl cyclohexane dicarboxylate, lactic acid, 2-hydroxybenzoic acid, 4-hydroxybenzoic acid, mandelic acid, and combinations of two or more thereof. Presently preferred carbonyl compound are terephthalic acid, isophthalic acid, dimethyl terephthalate, and dimethyl isophthalate, and oligomer thereof, because the polyesters produced therefrom have a wide range of industrial applications.

The contacting of the polymerization mixture with the metal sulfate alcohol composition can be carried out by any suitable means. Any suitable condition to effect the production of a polyester can include a temperature in the range of from about 200° C. to about 350° C., and preferably 250° C. to 300° C. under an absolute pressure in the range of from about 0.001 to about 2 atmosphere (0.1 to 202.6 kPa), for a time period of from about 0.3 to about 15 hours, preferably 1 to 10 hours.

The molar ratio of the glycol to carbonyl compound can be any ratio so long as the ratio can effect the production of an ester or polyester. Generally the ratio can be in the range of from about 1:1 to about 10:1, preferably about 1:1 to about 5:1, and most preferably 1:1 to 3:1.

The process of the invention can also be carried out using a conventional melt or solid state technique and in the presence or absence of a catalyst. The catalyst can be a titanium, cobalt, antimony, manganese, germanium, aluminum, silicon, zinc, or combinations thereof. A preferred catalyst is an antimony compound such as antimony oxides, antimony acetate, and antimony glycolate. It is optional to add phosphorous compound in the polymerization process.

The polyester produced with metal sulfate alcohol composition has broad applications in fibers, film, containers, as well as other applications such as plastics.

Comparing with the barium sulfate glycol slurry prepared by sand mill discussed in BACKGROUND OF THE INVENTION, a clear advantage of this invention over prior art is that the metal sulfate alcohol composition is stable, it does not separate into two layers or precipitate when stored without agitation for an extended period of time.

Comparing with the collosol of barium sulfate in glycol presented in the BACKGROUND OF THE INVENTION, another clear advantage of this invention over prior art is the use of more concentrated sulfuric acid of 18% to 105% by weight, preferably 30% to 100%, more preferably 50% to 80%. Higher sulfuric acid concentrations result in less water during the neutralization reaction in the preparation of said metal sulfate alcohol composition. I discovered that the metal sulfate particles size are more appropriate and less likely to form agglomerates with less water in sulfuric acid, therefore better dispersion in polyester.

A third advantage of this invention over prior art is the lower water content during neutralization reaction. There is less waste water to remove in distillation. Reduction of waste water is beneficial to the environment. The distillation is now an option, not a requirement like that in prior art. The metal sulfate alcohol composition with lower water content can be added to polyester polymerization process with or without prior distillation.

EXAMPLES

The following examples are included to further illustrate the invention and are not to be construed as to unduly limit the scope of the invention.

Polymer molecular weight is measured by intrinsic viscosity (IV). The IV is analyzed by the ratio of the viscosity of a solution of 0.8 g of polymer dissolved in 10 ml of hexafluoroisopropanol (HFIP) to the viscosity of the HFIP itself, at 25° C. in a capillary viscometer.

Example 1

Example 1 and Example 2 illustrates that water is important in the metal sulfate alcohol composition, in some cases water content too low may result in gel formation.

Ethylene glycol (EG, 83.4 g), water (10 g) and calcium hydroxide (95%, 2.9 g) were added to a 150-ml flask. The slurry was stirred with a magnet stirrer. Concentrated sulfuric acid (98.3% by weight, 3.7 g) was slowly added to the stirred slurry. After stirring for 1 hour, the slurry was kept in the flask under seal without agitation. After 24 hours, the slurry was stable, there was no substantial separation or precipitation. This metal sulfate alcohol composition contains calcium sulfate 5%, EG 83%, and water 12%.

Example 2

Ethylene glycol (EG, 93.4 g) and calcium hydroxide (95%, 2.9 g) were added to a 150-ml flask to produce slurry. The slurry was stirred with a magnet stirrer. Sulfuric acid (98.3% by weight, 3.7 g) was slowly added to the stirred slurry. White gel formed immediately, agitation stopped. The gel contained calcium sulfate 5%, EG 93%, water 2%. This gel cannot be used in polyester polymerization.

Example 3

Example 3 and Example 4 illustrates the preparation of metal sulfate alcohol composition.

Ethylene glycol (EG, 59.7 g) and barium hydroxide octahydrate (99%, 27.4 g) were added to a 150-ml flask. The slurry was stirred with a magnet stirrer. Sulfuric acid (65.5%, 12.9 g) was slowly added to the stirred slurry. After stirring for 1 hour, the slurry was kept in the flask under seal without agitation. After 24 hours, the slurry was stable, there was no substantial separation or precipitation. This metal sulfate alcohol composition contains barium sulfate 20%, EG 60%, and water 20%.

Example 4

Ethylene glycol (EG, 66 g) and barium hydroxide octahydrate (99%, 41 g) were added to a 150-ml flask. The slurry was stirred with a magnet stirrer. Dilute sulfuric acid (50%, 25 g) was slowly added to the stirred slurry. The slurry was then distilled at 160° C. to remove water 32 g. The distilled slurry was kept in the flask under seal without agitation. After 24 hours, the slurry was stable, there was no substantial separation or precipitation. This metal sulfate alcohol composition contains barium sulfate 30%, EG 66%, and water 4%.

Example 5

Example 5 and Example 6 illustrates that distillation to remove water may cause gel formation in certain metal sulfate alcohol compositions.

Ethylene glycol (EG, 87.5 g) and barium hydroxide monohydrate (99%, 8.2 g) were added to a 150-ml flask. The slurry was stirred with a magnet stirrer. Sulfuric acid (98% by weight, 4.3 g) was slowly added to the stirred slurry. After stirring for 1 hour, the slurry was kept in the flask under seal without agitation. After 24 hours, the slurry was stable, there was no substantial separation or precipitation. This metal sulfate alcohol composition contained barium sulfate 10%, EG 87.5%, and water 2.5%.

Example 6

Ethylene glycol (EG, 90 g) and barium hydroxide monohydrate (99%, 8.2 g) were added to a 150-ml flask. The slurry was stirred with a magnet stirrer. Sulfuric acid (98%, 4.3 g) was slowly added to the stirred slurry. After stirring for 1 hour, the barium sulfate alcohol composition was distilled at 197° C. to remove water 2.5 g. Small amount of gel formed immediately. After 24 hours, all became gel. The gel contained barium sulfate 10%, EG 90%. This gel cannot be used in polyester polymerization.

Example 7

1,4-Butanediol (BDO, 90.9 g) and barium hydroxide octahydrate (99%, 6.9 g) were added to a 150-ml flask. The slurry was stirred with a magnet stirrer for 20 minutes. Sulfuric acid (98%, 2.2 g) was slowly added to the stirred slurry. The slurry was stirred and heated to 120° C. for 60 minutes. The slurry was then kept in the flask under seal without agitation. After 24 hours, the slurry was stable, there was no substantial separation or precipitation. This metal sulfate alcohol composition contains barium sulfate 5%, BDO 91%, and water 4%.

Example 8

Methanol (64 g) and barium hydroxide octahydrate (99%, 27.4 g) were added to a 150-ml flask. The slurry was stirred with a magnet stirrer. Sulfuric acid (98% by weight, 8.6 g) was slowly added to the stirred slurry. After stirring for 1 hour, the slurry was kept in the flask under seal without agitation. After 24 hours, the slurry was stable, there was no substantial separation or precipitation. This metal sulfate alcohol composition contained barium sulfate 20%, methanol 64%, and water 16%.

Example 9

Glycerol (59.7 g) and barium hydroxide octahydrate (99%, 27.4 g) were added to a 150-ml flask. The slurry was stirred with a magnet stirrer. Sulfuric acid (65.5% by weight, 12.9 g) was slowly added to the stirred slurry. After stirring for 1 hour, the slurry was kept in the flask under seal without agitation. After 24 hours, the slurry was stable, there was no substantial separation or precipitation. This metal sulfate alcohol composition contained barium sulfate 20%, glycerol 60%, and water 20%.

Example 10

Example 10 and Example 11 illustrates the preparation of polyester containing metal sulfate alcohol composition.

The polyester esterification and polycondensation process are well known to one skilled in the art, only a brief description is provided herein.

In the esterifier of a continuous polymerization process, terephthalic acid is esterified by ethylene glycol to form oligomer of polyethylene terephthalate (PET) with degree of polymerization between 5 and 10. This oligomer is used in the following batch polymerization experiment in the lab.

A pot is preheated to 265° C. A 500-ml glass kettle is provided with an agitator, a thermocouple, condenser and nitrogen sweep. To this kettle it is added 100 g of EG, 400 g of oligomer, 20 g of the metal sulfate alcohol composition containing barium sulfate 20% and water 20% prepared in Example 3, and 12 g of antimony glycolate solution (containing 1% Sb by weight). The temperature is increased to 265° C. and held until oligomer is liquefied, the agitator is turned on at 60 rpm. Temperature is raised to 275° C. and vacuum reduced to 120 mm Hg (16 kPa) and held for 20 minutes. The temperature is then increased to 280° C. and vacuum reduced to 30 mm Hg (4 kPa) and hold for 20 minutes. Thereafter, the vacuum is reduced to 1 mm Hg (0.133 kPa) while temperature is held at 285° C. When the torque reaches 3 kg, agitator speed is reduced to 40 rpm. Polymerization stops when the torque reaches 4 kg at 40 rpm.

The polymer melt is poured into a water bath, and the resultant solid is crystallized at 90° C. in a vacuum oven for 1 hour and ground to pass a 2-mm filter. The grounded polymer is dried in the oven at 90° C. for another hour. The polymer containing barium sulfate 1% is analyzed for molecular weight, IV about 0.65.

Example 11

The procedures were the same as those in Example 10, except that 13.3 g of the metal sulfate alcohol composition containing barium sulfate 30% and water 4% prepared in Example 4 was used, instead of the 20 g of the composition containing barium sulfate 20% and water 20% prepared in Example 3. The polymer containing barium sulfate 1% is similar to that from Example 10, and it has intrinsic viscosity IV 0.66. The distillation and lower water content in Example 4 does not present significant advantage to the polyester.

Example 12

Ethylene glycol (EG, 28 g), water 10 g, and sulfuric acid (50%, 61.5 g) were added to a 250-ml flask. The solution was agitated with a magnet stirrer. Barium hydroxide octahydrate (99%, 100 g) was slowly added to the agitated slurry. The slurry was then gradually heated and distilled up to 197° C. to remove water 97.3 g. The distilled slurry was kept in the flask under seal without agitation. After 24 hours, the slurry was stable, there was no substantial separation or precipitation. This metal sulfate alcohol composition contains barium sulfate 71.6%, EG 27.4%, and water 0.01%.

I claim:

1. A process for producing a metal sulfate alcohol composition comprising contacting (a) a metal hydroxide, (b) sulfuric acid, (c) an alcohol, wherein said metal sulfate is calcium sulfate, barium sulfate, strontium sulfate, lead sulfate, or combinations of two or more thereof, said metal hydroxide is calcium hydroxide, barium hydroxide, strontium hydroxide, lead hydroxide, or combinations of two or more thereof, said barium hydroxide is $Ba(OH)_2 \cdot nH_2O$, n is 0 to 20;

said sulfuric acid has concentrations of 18% to 105% by weight; said alcohol is $Z(OH)_m$, Z is a hydrocarbon or a hydrocarbon oxygen group, m is 1 to 5;

said alcohol is about 12% to about 98% by weight of said composition, and said metal hydroxide is about 1% to about 95% by weight of said composition, mole ratio of said sulfuric acid and said metal hydroxide is about 0.9:1.0 to about 1.1:1.0.

2. A process according to claim 1 wherein said alcohol is methanol, ethanol, propanol, butanol, glycerol, trimethylolpropane, 1,1,1-tris(hydroxymethyl)ethane, pentaerythritol, lactic acid, ethylene glycol, monoethylene glycol, 1,2-propanediol, 1,3-propanediol, 1,2-butanediol, 1,3-butanediol, 1,4-butanediol, pentylene glycol, neopentyl glycol, diethylene glycol, triethylene glycol, polyethylene glycol, or combinations of two or more thereof;

said metal sulfate is barium sulfate; said metal hydroxide is barium hydroxide anhydrous, barium hydroxide monohydrate, barium hydroxide octahydrate, or combinations of two or more thereof;

mole ratio of said sulfuric acid and said metal hydroxide is about 0.99:1.00 to about 1.01:1.00.

3. A process according to claim 2 wherein said barium hydroxide is barium hydroxide octahydrate, said barium hydroxide octahydrate is about 7% to about 83% by weight of said metal sulfate alcohol composition.

4. A process according to claim 3 wherein said barium hydroxide octahydrate is about 40% to about 70% by weight of said metal sulfate alcohol composition.

5. A process according to claim 2 wherein said sulfuric acid has concentrations of about 30% to 100% by weight.

6. A process according to claim 5 wherein said sulfuric acid has concentrations of about 50% to 80% by weight.

7. A process according to claim 2 wherein said alcohol is about 15% to 95% by weight of said metal sulfate alcohol composition.

8. A process according to claim 7 wherein said alcohol is about 23% to 67% by weight of said metal sulfate alcohol composition.

9. A process according to claim 2 wherein water in said metal sulfate alcohol composition is partially or completely removed by distillation or other suitable means.

10. A process according to claim 9 wherein after distillation said water is about 2% to about 6% by weight of said metal sulfate alcohol composition.

* * * * *